(12) United States Patent
Fargo et al.

(10) Patent No.: US 9,067,762 B2
(45) Date of Patent: Jun. 30, 2015

(54) ENERGY SAVINGS WITH OPTIMIZED MOTION PROFILES

(75) Inventors: Richard N. Fargo, Plainville, CT (US); Richard K. Pulling, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 815 days.

(21) Appl. No.: 13/380,934

(22) PCT Filed: Jul. 15, 2009

(86) PCT No.: PCT/US2009/050730
§ 371 (c)(1),
(2), (4) Date: Dec. 27, 2011

(87) PCT Pub. No.: WO2011/088207
PCT Pub. Date: Jan. 20, 2011

(65) Prior Publication Data
US 2012/0111670 A1    May 10, 2012

(51) Int. Cl.
*B66B 1/28* (2006.01)
*B66B 1/30* (2006.01)

(52) U.S. Cl.
CPC ............... *B66B 1/302* (2013.01); *Y02B 50/125* (2013.01); *B66B 1/285* (2013.01)

(58) Field of Classification Search
CPC .......... B66B 1/02; B66B 1/24; B66B 1/2458; B66B 2001/24; B66B 2001/2441; B66B 2001/2475; B66B 1/285; B66B 1/302; Y02B 50/125

USPC ......... 187/247, 289, 290, 293, 295, 296, 297, 187/397–393, 375, 376, 391–393; 318/375, 318/376
See application file for complete search history.

(56) References Cited

U.S. PATENT DOCUMENTS

| | | | |
|---|---|---|---|
| 3,891,064 A | 6/1975 | Clark | |
| 4,354,577 A * | 10/1982 | Yonemoto | 187/295 |
| 4,402,387 A * | 9/1983 | Tsuji et al. | 187/293 |
| 4,751,984 A * | 6/1988 | Williams et al. | 187/293 |
| 6,199,667 B1 | 3/2001 | Fischgold et al. | |
| 6,202,796 B1 * | 3/2001 | Lee | 187/293 |
| 6,619,434 B1 | 9/2003 | Smith et al. | |

(Continued)

FOREIGN PATENT DOCUMENTS

| | | | |
|---|---|---|---|
| CN | 1491179 A | | 4/2004 |
| JP | 56108673 A | | 8/1981 |

(Continued)

OTHER PUBLICATIONS

State Intellectual Property Office of People's Republic China, Office Action, Aug. 27, 2013, 11 pages.

(Continued)

*Primary Examiner* — Anthony Salata
(74) *Attorney, Agent, or Firm* — Cantor Colburn LLP

(57) ABSTRACT

An elevator system includes a car, a hoist motor for elevating and lowering the car, a brake for limiting car movement, an input device for selecting a destination for a run, and a controller. The controller receives a command from the input device and controls operation of the hoist motor and the brake. The controller has a loss reduction mode wherein the controller selects a velocity profile for the run that varies according to car load, run direction, and run distance to reduce a combined set of energy losses for the run.

15 Claims, 8 Drawing Sheets

(56) References Cited

U.S. PATENT DOCUMENTS

| | | | |
|---|---|---|---|
| 6,857,506 B1 * | 2/2005 | Tyni et al. | 187/282 |
| 7,032,715 B2 | 4/2006 | Smith et al. | |
| 7,416,057 B2 * | 8/2008 | Kostka | 187/382 |
| 7,546,906 B2 * | 6/2009 | Tyni et al. | 187/382 |
| 7,740,112 B2 * | 6/2010 | Iwata et al. | 187/393 |
| 7,919,940 B2 * | 4/2011 | Miller et al. | 318/163 |
| 8,622,177 B2 * | 1/2014 | Acquaviva | 187/290 |
| 8,789,660 B2 * | 7/2014 | Tenhunen | 187/295 |
| 2001/0017235 A1 | 8/2001 | Suga et al. | |
| 2001/0017241 A1 | 8/2001 | Suga et al. | |
| 2011/0226559 A1 * | 9/2011 | Chen et al. | 187/290 |
| 2013/0075199 A1 * | 3/2013 | Kauppinen et al. | 187/247 |

FOREIGN PATENT DOCUMENTS

| | | | |
|---|---|---|---|
| JP | 60207482 A | 10/1985 | |
| JP | 9272663 A | 10/1997 | |
| JP | 11292411 A | 10/1999 | |
| JP | 2000255918 A | 9/2000 | |
| JP | 3232026 B2 | 11/2001 | |
| JP | 2003238037 A | 8/2003 | |
| JP | 2005104620 A | 4/2005 | |
| JP | 2006111358 A | 4/2006 | |
| JP | 2006182554 A | 7/2006 | |
| JP | 2007168933 A | 7/2007 | |
| JP | 2007254069 A | 10/2007 | |
| JP | 2009528234 A | 8/2009 | |
| WO | 2007099197 A1 | 9/2007 | |

OTHER PUBLICATIONS

State Intellectual Property Office of People's Republic China, Search Report, Aug. 20, 2013, 2 pages.
Written Opinion of the International Searching Authority in International Application No. PCT/US2009/050730, dated Apr. 8, 2010.
International Search Report and Written Opinion for application PCT/US2009/050730, mailed Apr. 12, 2010, 10 pages.
Hakala et al., Energy-Efficient Elevators for Tall Buildings, paper presented at Council on Tall Buildings and Urban Habitat 6th World Congress, Melbourne, Australia, Feb./Mar. 2001.
Jong, Johannes de, Advances in Elevator Technology: Sustainable and Energy Implications, paper presented at Council on Tall Buildings and Urban Habitat 8th World Congress in Dubai, Mar. 2008.
Japanese Patent Office, Office Action, Jul. 16, 2013, 2 pages.

* cited by examiner

ENERGY SAVINGS WITH OPTIMIZED MOTION PROFILES

BACKGROUND

The present invention relates to elevators, and in particular, to energy losses during elevator runs.

Typical elevator systems include an elevator car attached to a counterweight by roping. A hoist motor and a brake act together to move the elevator car and counterweight up and down an elevator shaft. An elevator drive and controller provide energy to and control operation of the elevator system. Naturally, energy is needed to operate the hoist motor, the brake, and the rest of the elevator system. Some of the energy used performs useful work while other energy used is simply lost during operation, mostly as heat. In regenerative elevator systems, the hoist motor can periodically act in a regenerative mode to recuperate some of the energy used.

Some systems attempt to reduce the amount of energy used during operation. For example, some elevator controllers dispatch different elevator cars to different floors in an intelligent way to avoid redundant trips and reduce energy used by the overall system. Even when cars are dispatched intelligently, however, energy losses still occur in each elevator run. Some elevator systems attempt to operate with energy efficient motion parameters, but these systems do not tailor the motion parameters to reduce energy losses for a specific system performing a specific run. Consequently, undesirable and preventable energy losses continue to occur.

SUMMARY

According to the present invention, an elevator system includes a car, a hoist motor for elevating and lowering the car, a brake for limiting car movement, an input device for selecting a destination for a run, and a controller. The controller receives a command from the input device and controls operation of the hoist motor and the brake. The controller has a loss reduction mode wherein the controller selects a velocity profile for the run that varies according to car load, run direction, and run distance to reduce a combined set of energy losses for the run.

DETAILED DESCRIPTION

Figure 1:
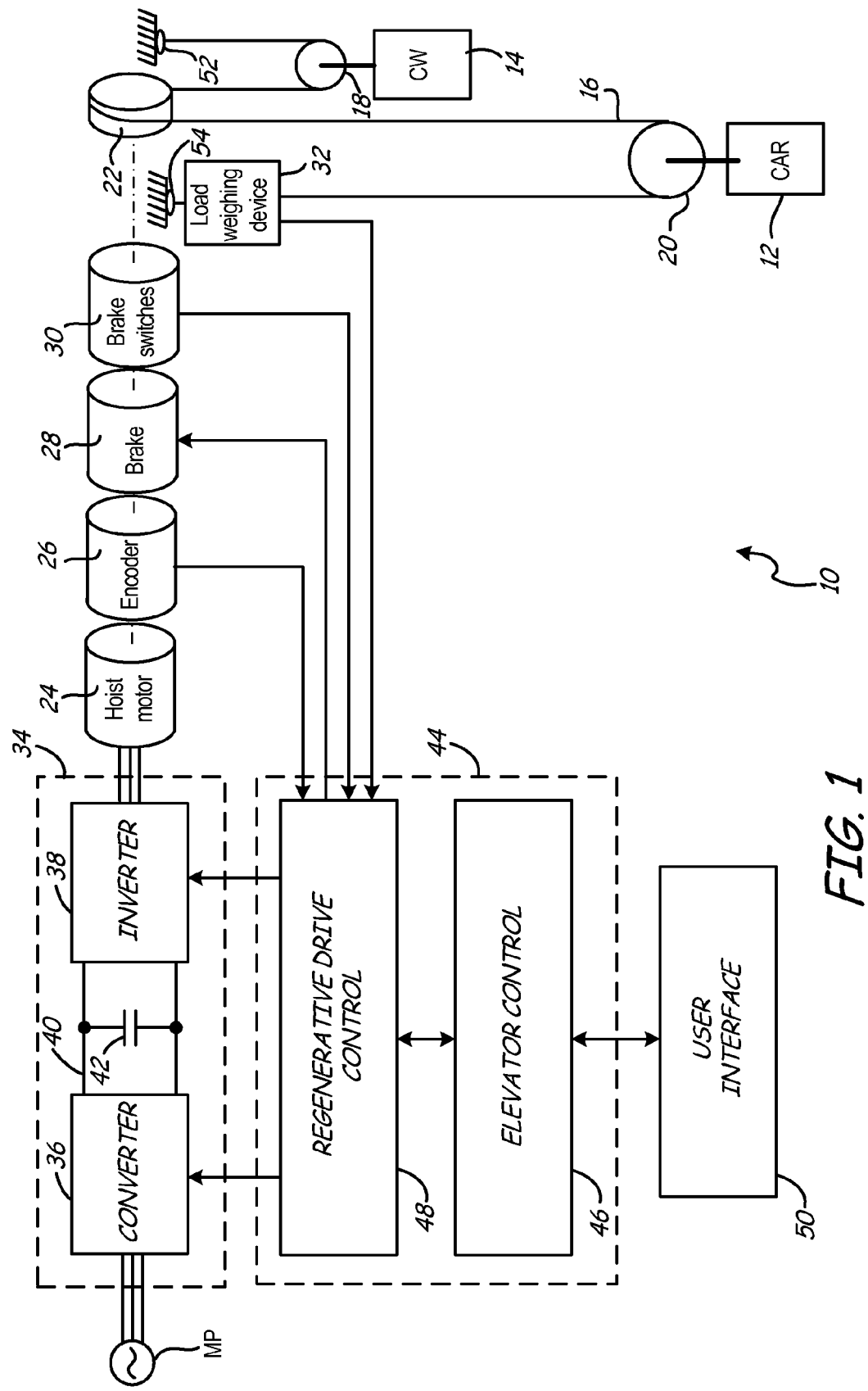
FIG. 1 is a block diagram of an elevator system of the present invention.

FIG. 1 is a block diagram of elevator system 10, which includes elevator car 12, counterweight 14, roping 16, pulleys 18 and 20, drive sheave 22, hoist motor 24, encoder 26, brake 28, brake switches 30, load weighing device 32, regenerative drive 34 (including converter 36, inverter 38, and DC bus 40 with capacitor 42), controller 44 (including elevator control 46 and regenerative drive control 48), and user interface 50.

In the diagram shown in FIG. 1, car 12 and counterweight 14 are suspended from roping 16 in a 2:1 roping configuration. Roping 16 extends from fixed attachment 52 downward to pulley 18, then upward over sheave 22, downward to pulley 20, and upward to load weighing device 32 and fixed attachment 54. Other roping arrangements may be used, including 1:1, 4:1, 8:1, and others.

Elevator car 12 is driven upward, and counterweight 14 is driven downward, when sheave 22 rotates in one direction. Elevator car 12 is driven downward and counterweight 14 is driven upward when sheave 22 rotates in the opposite direction. Counterweight 14 is selected to be approximately equal to the weight of elevator car 12 together with an average number of passengers (often estimated at 50% of a maximum load). Load weighing device 32 is connected to roping 16 to provide an indication of the total weight of elevator car 12 and its passengers. Load weighing device 32 may be located in a variety of different locations, such as a dead end hitch, on roping 16, on top of elevator car 12, underneath the car platform of elevator car 12, etc. Load weighing device 32 provides the sensed load weight to regenerative drive 34.

Drive sheave 22 is connected to hoist motor 24, which controls the speed and direction of movement of elevator car 12. Hoist motor 24 is, for example, a permanent magnet synchronous machine, which may operate as either a motor or as a generator. When operating as a motor, hoist motor 24 receives three-phase AC output power from regenerative drive 34 to cause rotation of drive sheave 22. The direction of rotation of hoist motor 24 depends on the phase relationship of the three AC power phases. Regenerative drive 34 receives power from main power supply MP, which can be a power utility grid for supplying three-phase AC power to regenerative drive 34. Converter 36 converts the three-phase AC power to DC voltage on DC bus 40. DC bus 40 can include one or more capacitors 42, which stores power for one or more purposes, such as to smooth the power on DC bus 40. DC voltage on DC bus 40 is then converted back to three-phase AC power suitable for driving hoist motor 24.

When hoist motor 24 is operating as a generator, power moves in the opposite direction. Drive sheave 22 rotates hoist motor 24 and causes three-phase AC power to be delivered from hoist motor 24 to inverter 38 of regenerative drive 34. Inverter 38 converts the three-phase AC power to DC voltage on DC bus 40. Converter 36 then converts some or all of the DC voltage on DC bus 40 to three-phase AC power suitable for returning to main power supply MP. In the illustrated embodiment, regenerative drive 34 sends most of the regenerated power back to main power supply MP, with only a small amount of regenerated power saved on capacitor 42 of DC bus 40. In an alternative embodiment, regenerative drive 34 can return regenerated power to a second power supply such as an energy storage system (not shown) in lieu of, or in addition to, returning power to main power supply MP.

Controller 44 communicates with the various components in elevator system 10, including regenerative drive 34, encoder 26, brake 28, brake switches 30, load weighing device 32, and user interface 50. Elevator control 46 of controller 44 receives inputs from an input device, such as user interface 50. User interface 50 can include user input devices such as hall call buttons and other input devices on a control panel within elevator car 12. Elevator control 46 determines direction in which elevator car 12 should move and the floors at which elevator car 12 should stop. Elevator control 46 then delivers control signals to regenerative drive control 48. Regenerative drive control 48 then provides signals to regenerative drive 34 that control when and in what direction to drive elevator car 12 and also control when to lift brake 28 to allow movement of elevator car 12, and when to drop brake 28 to limit movement of elevator car 12.

Brake 28 prevents rotation of motor 24 and drive sheave 22. Brake 28 is an electrically actuated brake that is lifted or maintained out of contact with the motor shaft when power is delivered to brake 28 by regenerative drive 34. When power is removed from brake 28, it drops or engages the shaft of hoist motor 24 (or an attachment to the shaft) to prevent rotation. Brake switches 30 monitor the state of brake 28, and provide inputs to regenerative drive 34.

Encoder 26 is mounted on the shaft of hoist motor 24 and provides encoder signals to regenerative drive control 48. The encoder signals allow regenerative drive 34 to achieve proper phase relationship between stator currents and rotor magnets, usually referred to as field orientation. Encoder 26 also provides encoder pulses to provide velocity feedback, so that the actual elevator velocity can be controlled to follow dictated velocity.

The power required to drive hoist motor 24 varies with acceleration and direction of movement of elevator car 12, as well as the load in elevator car 12. For example, if elevator car 12 is being accelerated, or run upward where elevator car 12 and its load have a combined weight greater than the weight of counterweight 14, or is run downward where elevator car 12 and its load have a weight that is less than the weight of counterweight 14, power from regenerative drive 34 is required to drive hoist motor 24, which in turn rotates drive sheave 22. If elevator car 12 is leveling, or running at a fixed speed with a balanced load, a lesser amount of power may be required by hoist motor 24 from regenerative drive 34. If elevator car 12 is being decelerated, or run downward where elevator car 12 and its load have a weight that is greater than counterweight 14, or run upward where elevator car 12 and its load have a weight that is less than counterweight 14, elevator car 12 drives sheave 22 and hoist motor 24. In that case, hoist motor 24 operates as a generator to generate three-phase AC power that is supplied to regenerative drive 34.

Over a typical day, the sum of work performed by elevator system 10 is approximately zero on average. This is because driving and regeneration should generally cancel out by the end of the day as the energy used to lift the masses is regenerated when those masses are lowered. For example, in a typical office building, the masses lifted up the building in the morning are lowered at the end of the day. In a case where material is being moved into a building, net work will be positive, however this work is unavoidable and provides direct value to the user. Thus, most of the energy that is undesirably consumed by elevator system 10 will be due to energy losses in elevator system 10. Therefore, reducing energy losses in elevator system 10 has a major impact on reducing total energy used in elevator system 10.

One major area of energy losses in elevator system 10 are machine losses in hoist motor 24 and brake 28. Hoist motor 24 has one set of losses from resistance heating of windings commonly called "copper losses". In a permanent magnet machine such as hoist motor 24, current is directly proportional to torque and copper losses are directly related to the square of the torque generated by hoist motor 24. Torque generated by hoist motor 24 is proportional to the unbalance of load between elevator car 12 and counterweight 14 plus the accelerating torque. The copper losses can be approximated as:

$$\text{Copper losses} = (K1*(L-L_B)+K2*\text{Acceleration})^2$$

The constants K1 and K2 are calculated from system parameters and machine parameters. $L-L_B$ is the difference between the actual load L in elevator car 12 and a balanced load $L_B$ that would balance elevator car 12 with counterweight 14. Ultimately, copper losses are reduced at low values of torque, independent of velocity. Since acceleration can have either a positive or negative sign, this equation can be solved algebraically to find the value of acceleration which results in zero copper losses during either acceleration or deceleration phases of elevator operation, but not both. Zero copper loss occurs when acceleration=$(K1*(L-L_B))/(-K2)$. If copper losses during acceleration were the only losses to consider, this would be the optimum acceleration. However, as the acceleration affects run time, velocity, and other parameters, it is not appropriate to optimize copper losses alone.

Hoist motor 24 has another set of losses commonly called "iron losses" or "core losses". Iron losses occur as a result of reversals of magnetic fields in iron causing eddy currents in hoist motor 24, and are a function of motor speed. The iron losses can be approximated as:

$$\text{Iron losses} = K3*\text{Velocity}^{K4}$$

The constants K3 and K4 are calculated from machine parameters particular to a given hoist motor 24. For example, a PM138 permanent magnet motor manufactured by Otis Elevator Company of Farmington Conn. has a value for K4 of about 1.3. Ultimately, iron losses are reduced at low values of velocity, largely independent of acceleration.

Brake 28 has losses resulting from raising and dropping brake 28. When brake 28 is engaged (dropped), typically no energy is used. When brake 28 is lifted, power is used to hold brake 28 out of engagement until the end of a run when brake 28 is once again dropped. In many elevator systems 10, brake power loss is a constant at any given time, approximated as:

$$\text{Brake power} = K5$$

In other embodiments of elevator system 10, brake 28 has two power constants, one based upon power needed to lift brake 28 and another based upon power needed to hold brake 28 for the course of a run. In both cases, brake losses are reduced for shorter run times, independent of velocity and acceleration.

Together, total machine power loss is approximated as:

$$P_{total} = (K1*(L-L_B)+K2*\text{Acceleration})^2 + K3*\text{Velocity}^{K4}+K5$$

Actual energy lost for a given run is a time integration of the power loss curve for that run. Reduction of machine losses for the run can be achieved by selecting a velocity profile to reduce the area under the power loss curve. This can be better understood by looking at particular velocity profiles and power loss curves for different runs.

FIGS. 2A-4B are graphs illustrating velocity profile 100 and power loss curve 102 for a 6 meter (m) long upward runs with different loads. The runs are broken down into the following sections: First constant jerk $J_1$, constant acceleration A, second constant jerk $J_2$, constant velocity V, third constant jerk $J_3$, constant deceleration D, and fourth constant jerk $J_4$.

Figure 2A:
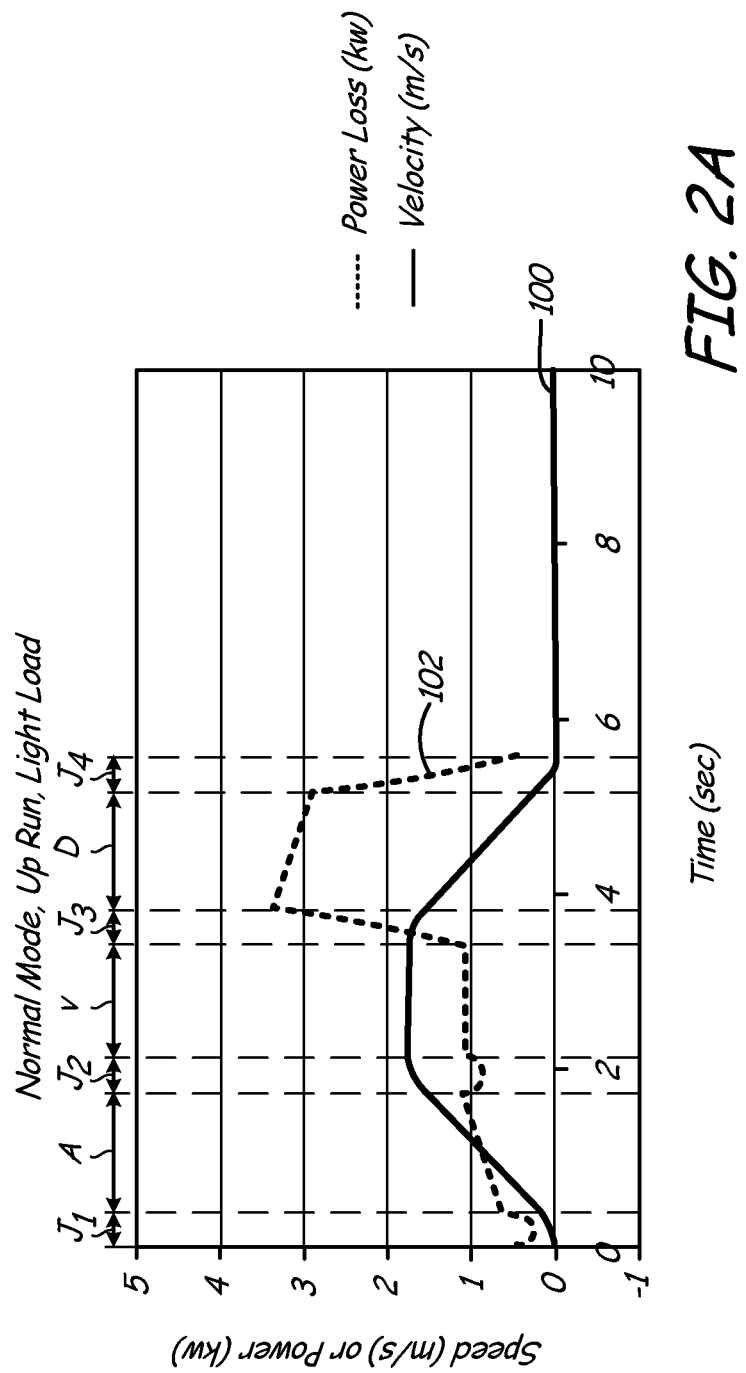
FIG. 2A is a graph illustrating a velocity profile and power loss curve for an up run with a light load when operating in normal mode.

FIG. 2A is a graph illustrating velocity profile 100 and power loss curve 102 for an up run with a light load when operating in normal mode. A down run with a heavy load would look similar. The load is 20% of the maximum rated load. In normal mode, actual values for the velocity profile sections are:

| Velocity Profile Section | Value |
| --- | --- |
| $J_1$ | 2.5 (m/s^3) |
| A | 1 (m/s^2) |
| $J_2$ | −2.5 (m/s^3) |
| V | 1.75 (m/s) |
| $J_3$ | −2.5 (m/s^3) |
| D | −1 (m/s^2) |
| $J_4$ | 2.5 (m/s^3) |

This normal mode run has about 8,666 joules in machine losses and takes about 5.6 seconds. The greatest power loss occurs during constant deceleration D. Because this load is lighter than a balanced load, this up run would actually regenerate energy, overall. Nonetheless, these machine losses can be reduced, which causes more of the energy to be converted into regenerated electrical power.

Figure 2B:
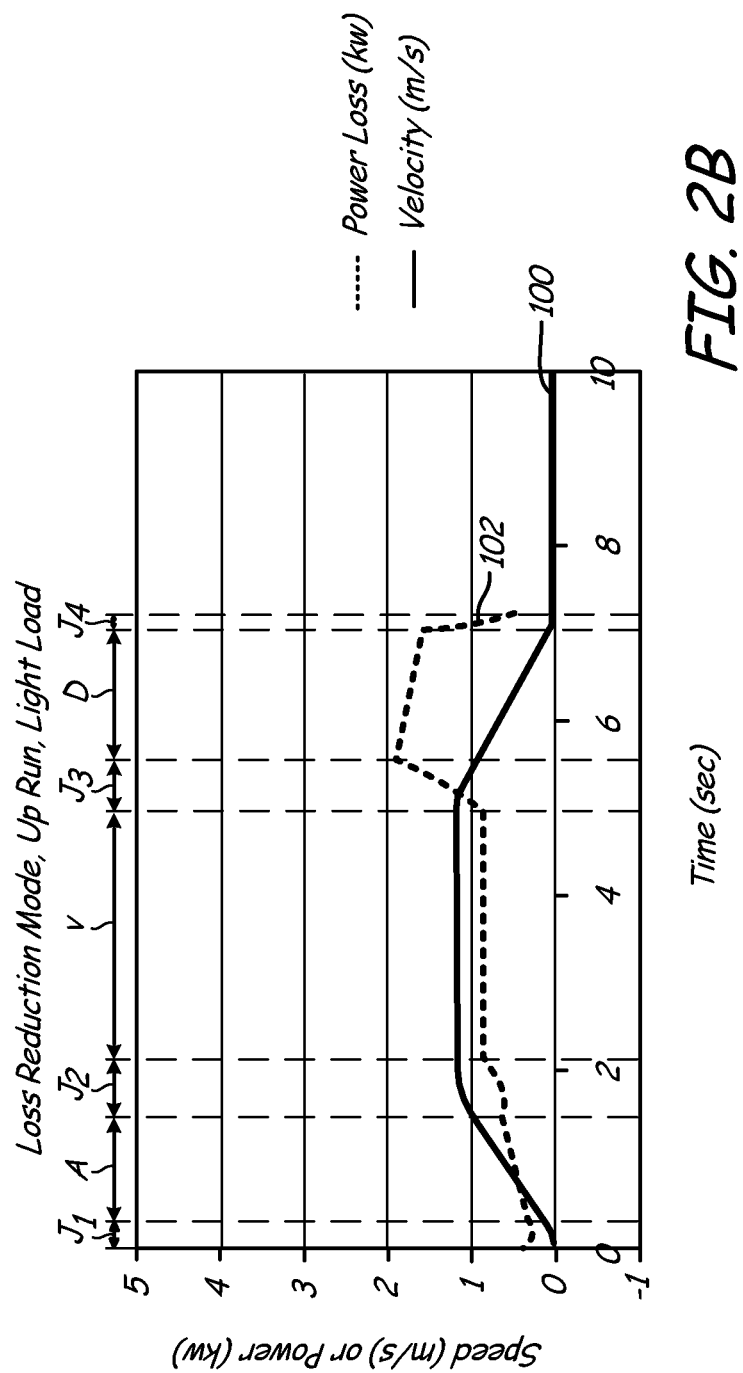
FIG. 2B is a graph illustrating a velocity profile and power loss curve for an up run with a light load when operating in loss reduction mode.

FIG. 2B is a graph illustrating velocity profile 100 and power loss curve 102 for an up run with a light load when operating in loss reduction mode. The load is again 20% of the maximum rated load. In loss reduction mode, actual values for the velocity profile sections are:

| Velocity Profile Section | Value |
| --- | --- |
| $J_1$ | 3 (m/s^3) |
| A | 0.7 (m/s^2) |
| $J_2$ | −1 (m/s^3) |
| V | 1.15 (m/s) |
| $J_3$ | −1 (m/s^3) |
| D | −0.6 (m/s^2) |
| $J_4$ | 3 (m/s^3) |

This loss reduction mode run has about 7,097 joules in machine losses and takes about 7.2 seconds. This results in a savings of about 1,569 joules and takes about 1.6 seconds longer for the 6 m run.

Figure 3A:
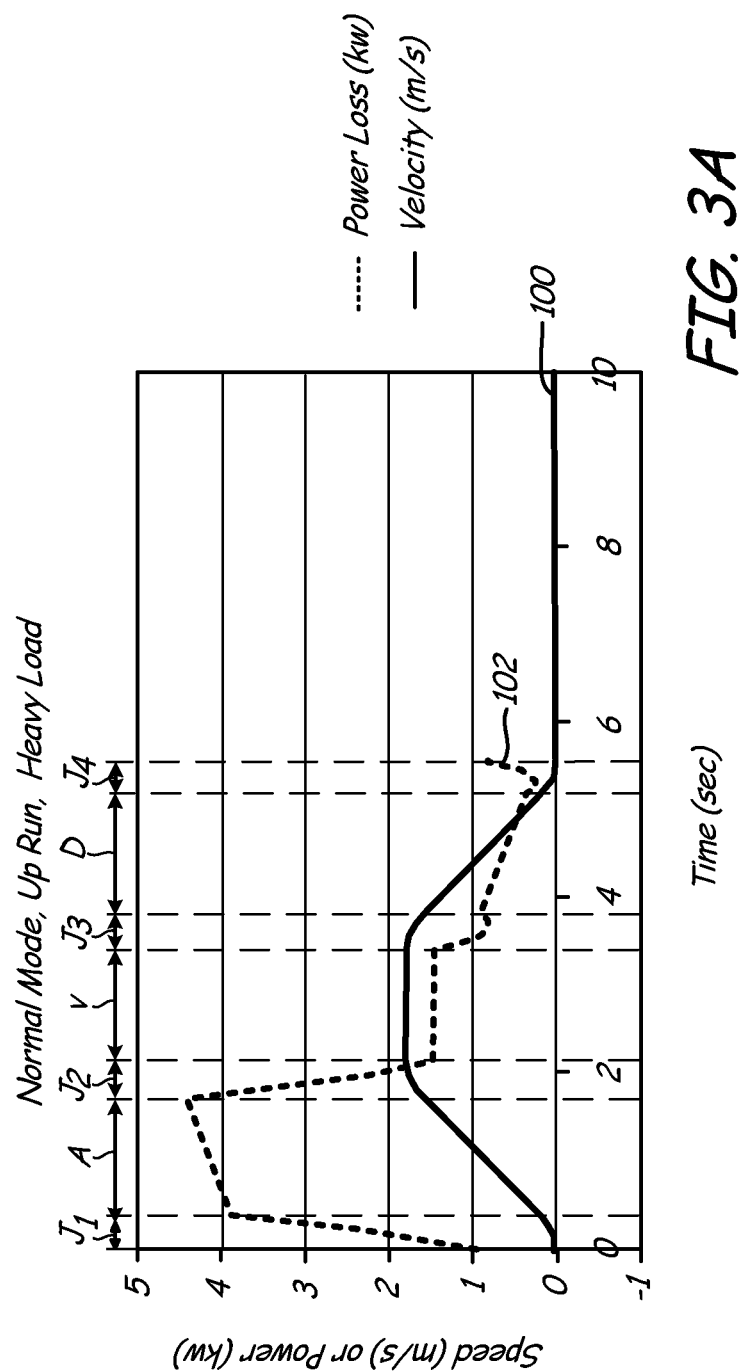
FIG. 3A is a graph illustrating a velocity profile and power loss curve for an up run with a heavy load when operating in normal mode.

FIG. 3A is a graph illustrating velocity profile 100 and power loss curve 102 for an up run with a heavy load when operating in normal mode. A down run with a light load would look similar. The load is 90% of the maximum rated load. In normal mode, actual values for the velocity profile sections are the same as those for the normal profile with the light load:

| Velocity Profile Section | Value |
| --- | --- |
| $J_1$ | 2.5 (m/s^3) |
| A | 1 (m/s^2) |
| $J_2$ | −2.5 (m/s^3) |
| V | 1.75 (m/s) |
| $J_3$ | −2.5 (m/s^3) |
| D | −1 (m/s^2) |
| $J_4$ | 2.5 (m/s^3) |

This normal mode run has about 10,634 joules in machine losses and takes about 5.6 seconds. The greatest power loss occurs during constant acceleration A. Because this load is heavier than a balanced load, this up run would use energy which these machine losses would add to.

Figure 3B:
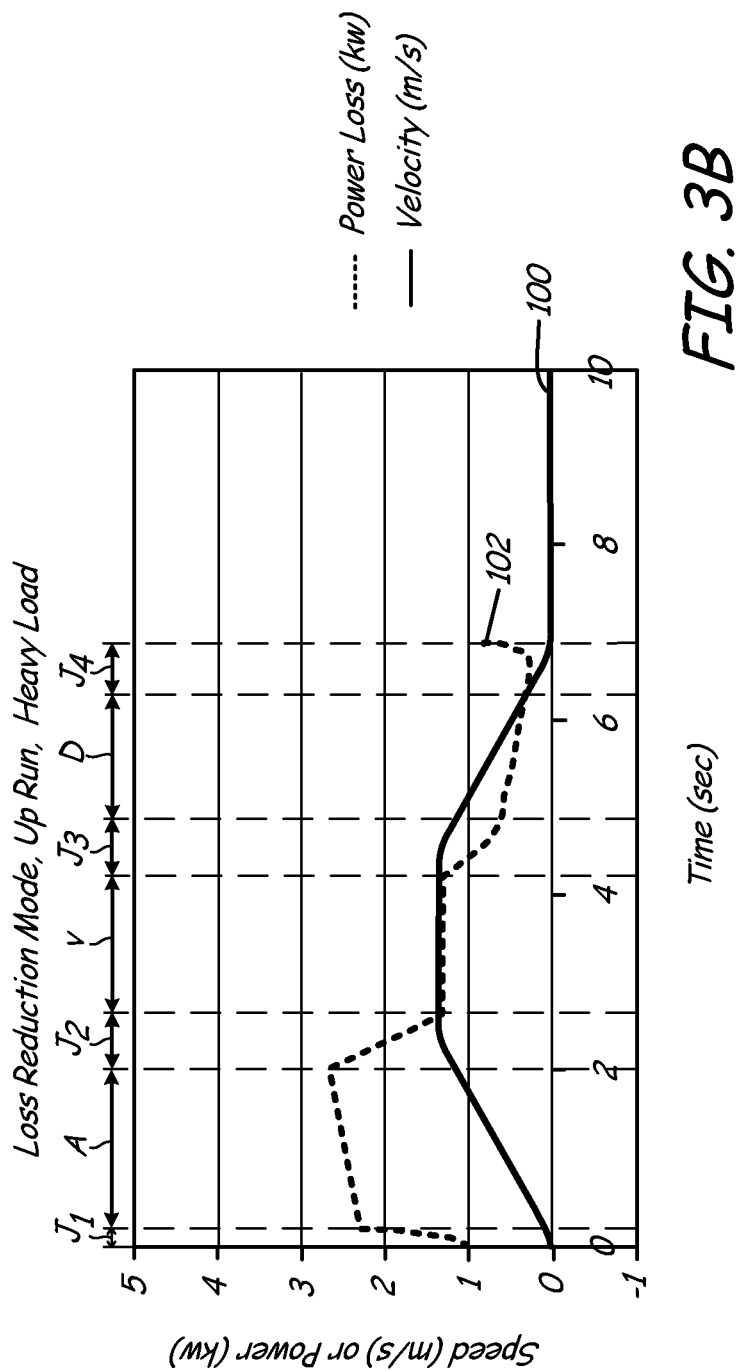
FIG. 3B is a graph illustrating a velocity profile and power loss curve for an up run with a heavy load when operating in loss reduction mode.

FIG. 3B is a graph illustrating velocity profile 100 and power loss curve 102 for an up run with a heavy load when operating in loss reduction mode. The load is again 90% of the maximum rated load. In loss reduction mode, actual values for the velocity profile sections are:

| Velocity Profile Section | Value |
| --- | --- |
| $J_1$ | 3 (m/s^3) |
| A | 0.6 (m/s^2) |
| $J_2$ | −1 (m/s^3) |
| V | 1.35 (m/s) |
| $J_3$ | −1 (m/s^3) |
| D | −0.6 (m/s^2) |
| $J_4$ | 3 (m/s^3) |

This loss reduction mode run has about 9,575 joules in machine losses and takes about 6.9 seconds. This results in a savings of about 1,059 joules and takes about 1.3 seconds longer for the 6 m run.

Figure 4A:
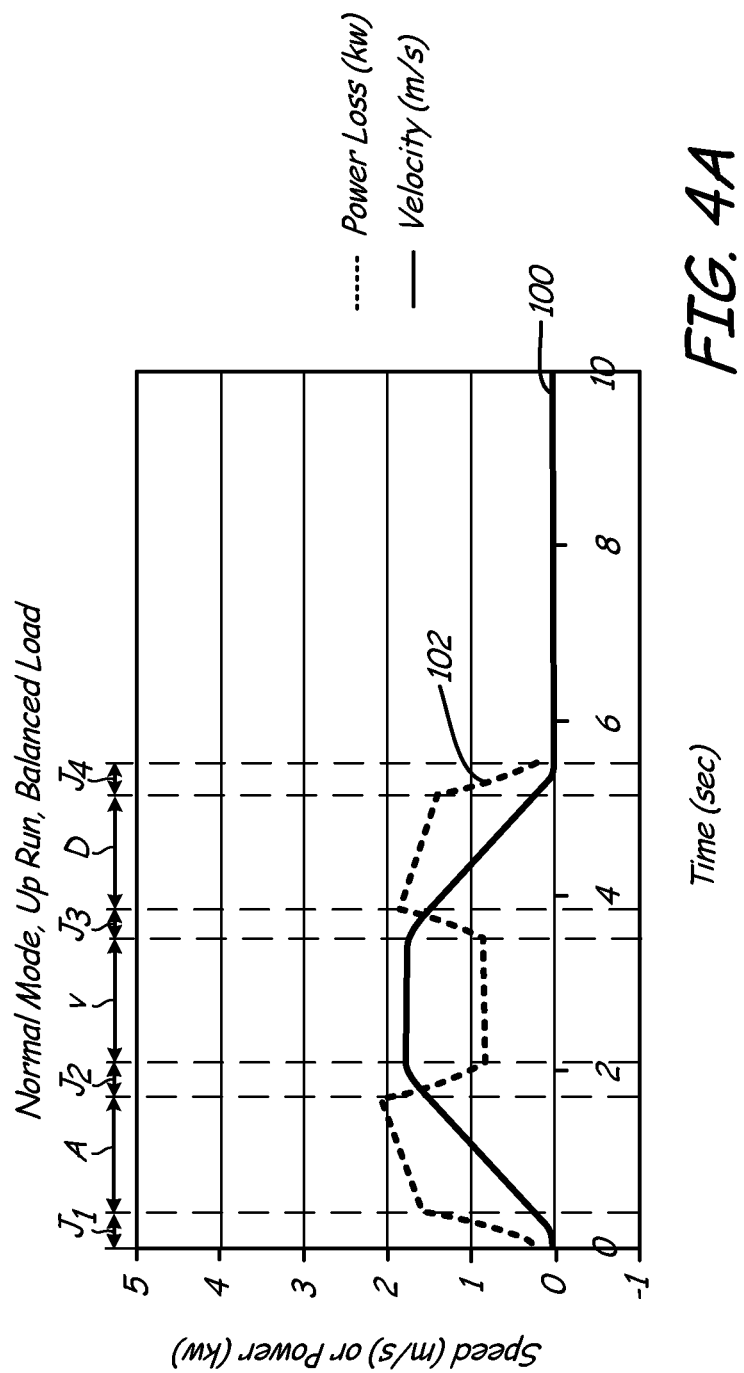
FIG. 4A is a graph illustrating a velocity profile and power loss curve for an up run with a balanced load when operating in normal mode.

FIG. 4A is a graph illustrating velocity profile 100 and power loss curve 102 for an up run with a balanced load when operating in normal mode. A down run with a balanced load would look similar. The load is 50% of the maximum rated load. In normal mode, actual values for the velocity profile sections are the same as those for the normal profile with the light load and with the heavy load:

| Velocity Profile Section | Value |
| --- | --- |
| $J_1$ | 2.5 (m/s^3) |
| A | 1 (m/s^2) |
| $J_2$ | −2.5 (m/s^3) |
| V | 1.75 (m/s) |
| $J_3$ | −2.5 (m/s^3) |
| D | −1 (m/s^2) |
| $J_4$ | 2.5 (m/s^3) |

This normal mode run has about 7,263 joules in machine losses and takes about 5.6 seconds. The greatest power loss occurs during constant acceleration A and constant deceleration D. However, losses in all sections of the velocity profile are relatively low because $K1*(L-L_B)=0$. This reduces copper losses throughout the velocity profile. Because it has a balanced load, this run produces no net work (considering regeneration) over the run. Thus, all energy use is for losses.

Figure 4B:
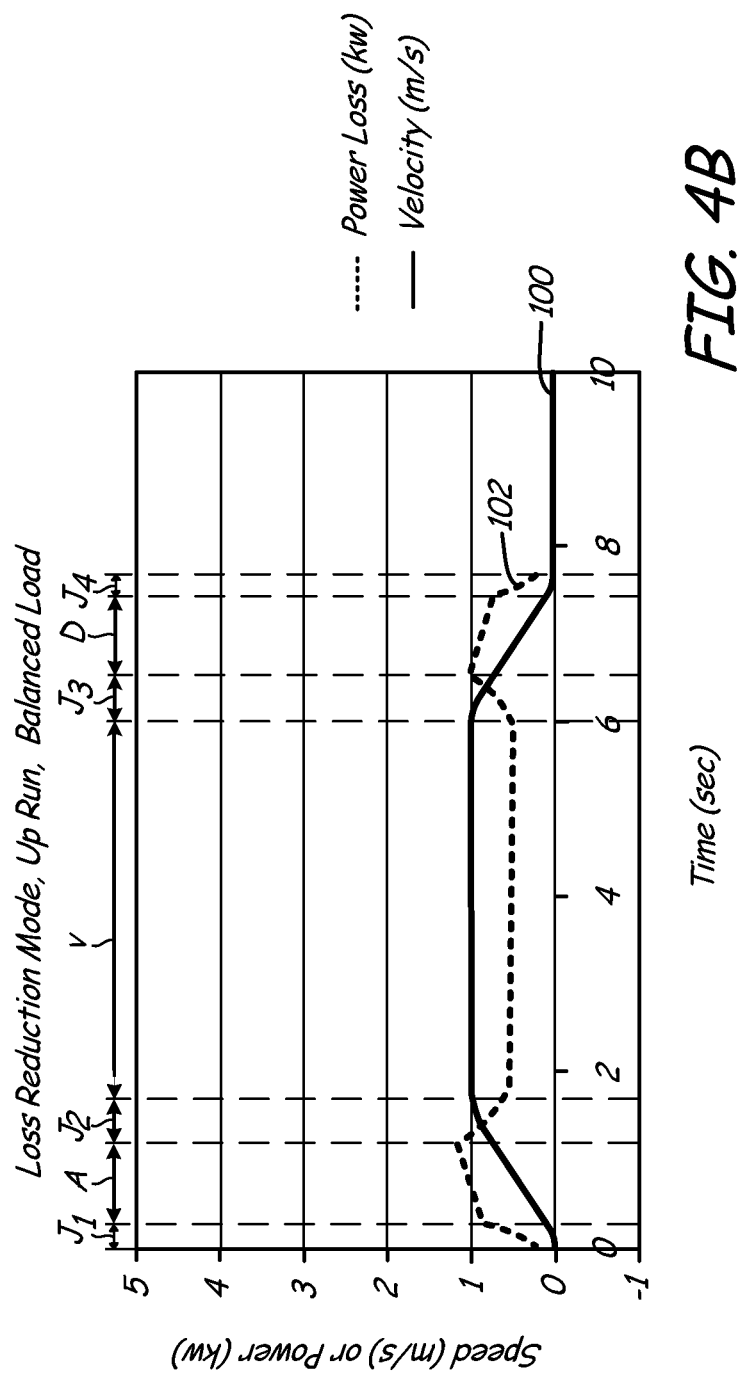
FIG. 4B is a graph illustrating a velocity profile and power loss curve for an up run with a balanced load when operating in loss reduction mode.

FIG. 4B is a graph illustrating velocity profile 100 and power loss curve 102 for an up run with a balanced load when operating in loss reduction mode. The load is again 50% of the maximum rated load. In loss reduction mode, actual values for the velocity profile sections are:

| Velocity Profile Section | Value |
| --- | --- |
| $J_1$ | 3 (m/s^3) |
| A | 0.7 (m/s^2) |
| $J_2$ | −1 (m/s^3) |
| V | 1 (m/s) |
| $J_3$ | −1 (m/s^3) |
| D | −0.7 (m/s^2) |
| $J_4$ | 3 (m/s^3) |

This loss reduction mode run has about 5,237 joules in machine losses and takes about 7.7 seconds. This results in a savings of about 2,026 joules and takes about 2.1 seconds longer for the 6 m run.

The velocity profile for each of the normal mode runs are the same regardless of load. The goal of the normal run is to provide a relatively quick run while maintaining rider comfort and safety. The normal mode runs can be useful when speed concerns are more important than energy savings.

The velocity profiles for the loss reduction mode runs differ not only from the normal runs, but also from each other. Because copper losses vary with load, the optimum velocity profile for loss reduction also varies with load. For example, in an up run with a light load (FIGS. 2A and 2B) the greatest power loss occurs during constant deceleration D. Power loss during constant acceleration A is relatively small. Consequently, magnitude of acceleration A is greater than magnitude of deceleration D for the loss reduction mode with the up run with the light load. However, an up run with a heavy load (FIGS. 3A and 3B) has its greatest power loss during constant acceleration A. Thus, magnitude of acceleration A for the loss reduction mode with the up run with the heavy load (FIG. 3B) is less than magnitude of acceleration A for the up run with a light load (FIG. 2B).

In another example, the up run with a balanced load (FIGS. 4A and 4B) has the benefit of no copper losses due to load imbalance since $K1*(L-L_B)=0$. The up run with the balanced load still has copper losses associated with acceleration ($K2*Acceleration)^2$), but it does not have copper losses just for holding an imbalance of weight. This causes the loss reduction mode for an up run with a balanced load to have less incentive to end the run quickly as compared to up runs with either light or heavy loads. Consequently, the loss reduction mode for the up run with a balanced load benefits from having a velocity profile with the slowest constant velocity portion as compared to the other profiles. Copper losses are reduced with reduced acceleration, iron losses are reduced with reduced velocity. Brake losses did increase due to the increased run time, however the benefits related to copper and iron loss reductions more than compensated for the increased brake coil losses. Depending on load, direction, and distance, a different velocity profile will result in lower machine losses. This shows that the conventional wisdom of using a single velocity profile for all runs in an attempt to reduce losses is actually not wise at all.

The effect of energy consumption for changes in some velocity profile parameters varies with the load. The effect of energy consumption for changes in other velocity profile parameters is less load dependent. For example, loss reduction mode benefited by increasing $J_1$ and $J_4$ for light load, heavy load, and balanced load. This is because when velocity is near zero, energy is lost due to operating brake 28 and due to copper losses (when supporting an unbalanced load) even if virtually no movement is occurring. Power output of a slowly turning hoist motor 24 is near zero, while the copper losses may be near their maximum value, making efficiency of hoist motor 24 close to zero at the beginning and end of an elevator run. Thus, once brake 28 is lifted, overall energy losses are reduced by reaching constant acceleration relatively quickly. Similarly, once deceleration is substantially finished, energy losses are reduced by reaching a stop and dropping brake 28 relatively quickly. Thus, energy losses can be reduced by increasing jerk magnitude. This shows that the conventional wisdom that reducing jerk magnitude always reduces energy loss is also in error. By assuming constant motor efficiency, as done in prior art energy studies, incorrect conclusions for elevator energy consumption were routinely reached in the past.

While increasing $J_1$ and $J_4$ has a substantial impact on energy consumption, modifying the segments for $J_2$ and $J_3$ have only a minor impact on energy consumption. This is because $J_2$ and $J_3$ occur when elevator system 10 is operating near full speed and have little impact on running time.

Different systems can benefit from different velocity profiles. In some systems, a combined set of energy losses for a run in which elevator car 12 has a relatively light load traveling downward can be reduced by increasing magnitude of deceleration. Velocity profile parameters can vary in virtually any direction depending on the interaction on the various potential losses for a particular elevator system 10.

In addition to machine losses, there are also losses related to regenerative drive 34. Drive losses include switching losses for converting between DC and AC power and are approximately proportional to current. The drive losses can be approximated as:

$$\text{Drive losses}=K6*(L-L_B)+K7*\text{Acceleration}$$

Much like K1 and K2 of the copper losses, the constants K6 and K7 are calculated from system parameters and machine parameters. Also like copper losses, drive losses are reduced at low values of acceleration, independent of velocity. Together, total machine power loss and drive power loss is approximated as:

$$P_{total}=(K1*(L-L_B)+K2*\text{Acceleration})^2+ K3*\text{Velocity}^K4+K5+(K6*(L-L_B)+ K7*\text{Acceleration})$$

Velocity profiles, similar to those of FIGS. 2A-4B, can be created such that loss reduction mode considers machine losses and drive loss, as well as other losses present in a particular regenerative elevator system. The equations and velocity profiles can also be modified for use with alternative propulsion technologies, such as induction motors, or non-regenerative drives which include additional losses in dynamic braking resistors.

A velocity profile can be optimized in a loss reduction mode to reduce losses while also considering a set of constraints on the loss reduction mode. For example, maximum values for velocity, acceleration, and jerk can be established to reduce equipment wear, to increase user safety, and to increase user comfort. Additionally, maximum values for time for a run can be established to limit run times to a range acceptable to users. The velocity profile can be selected to reduce energy loss within these or other constraints.

Figure 5:
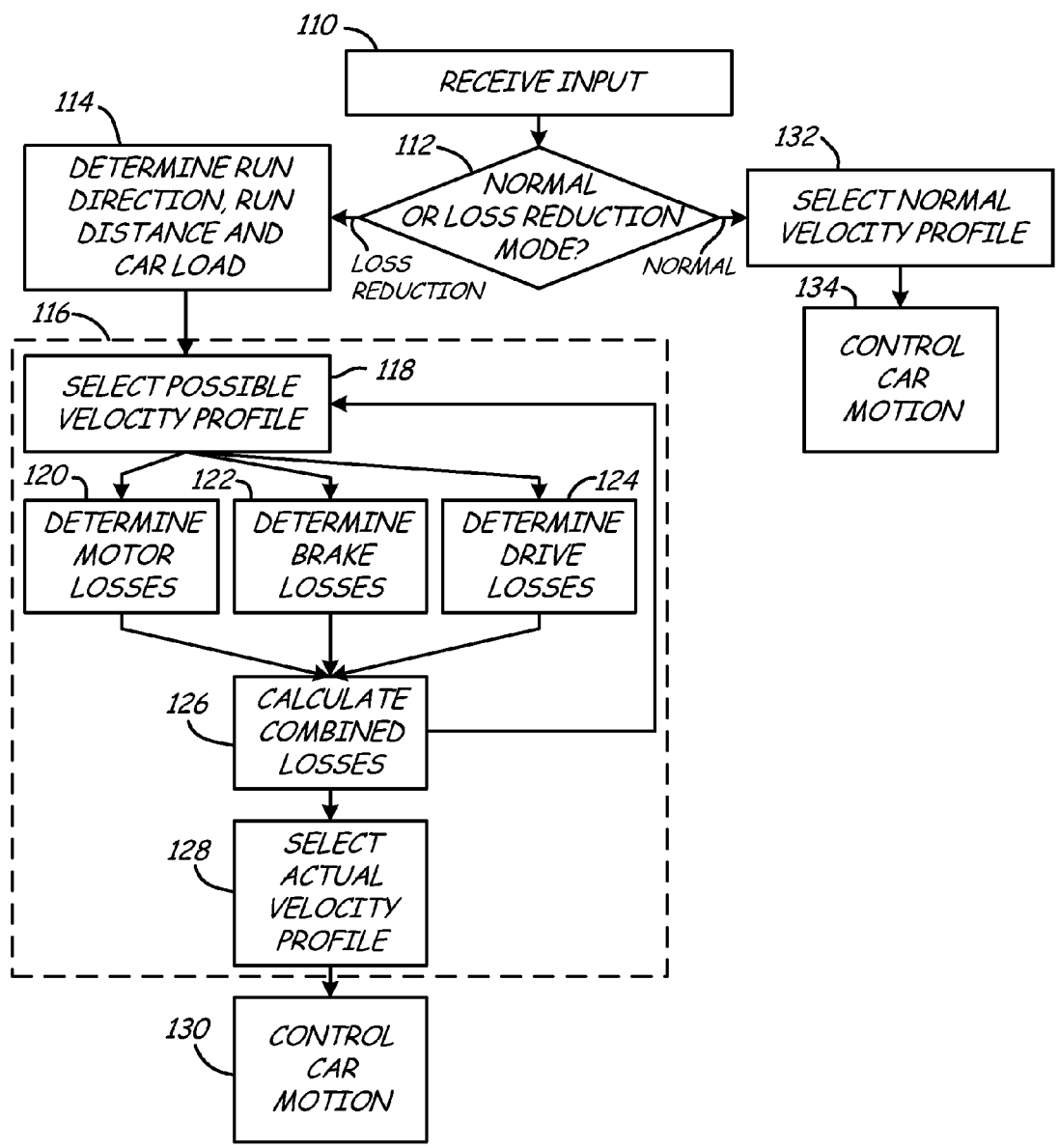
FIG. 5 is a flow chart illustrating a method of operating the elevator system of FIG. 1 to select a velocity profile.

FIG. 5 is a flow chart illustrating a method of operating elevator system 10 to select a velocity profile. To begin, an input, such as a user input, is received selecting a destination (step 110). Once the input is selected, controller 44 determines whether to operate in normal mode or in loss reduction mode (step 112). This decision can be made based upon time of day, traffic patterns, power available from main power supply MP and a second power supply, if any, or other considerations. If loss reduction mode is selected, run direction, run distance, and car load are determined (step 114). Run direction and run distance can be determined based upon the input received in step 110 combined with other inputs received. Car load can be determined by load weighing device 32 as described above with respect to FIG. 1.

Based upon direction, distance, and load, controller 44 then selects a velocity profile to reduce a combined set of energy losses including motor losses, brake losses, and drive losses for the run (step 116). Selection of the velocity profile can be performed in a variety of ways to reduce energy loss within a set of constraints. For example, controller 44 can reference a lookup table with stored velocity profile values that correspond to an optimized velocity profile for elevator system 10 considering the direction, distance, and load for the upcoming run. Alternatively, velocity profile selection could occur dynamically applying an optimization routine or simply testing all possible velocity profiles within the constraints.

If the velocity profile is selected dynamically, controller 44 can first select a possible velocity profile (step 118). Then controller 44 can determine motor losses (step 120), brake losses (step 122), and drive losses (step 124) as well as any other relevant losses for the possible velocity profile. Next, controller 44 can calculate the combined energy losses to find a total energy lost for the possible velocity profile (step 126). Steps 118-126 can be repeated until controller 44 converges on an optimized velocity profile or until controller 44 tests all possible velocity profiles. Once a sufficient number of possible velocity profiles have been considered, an actual velocity profile where energy losses are substantially minimized within a set of constraints is selected (step 128). The terms "optimized" and "minimized" do not, of course, suppose that controller 44 calculates all possible energy losses with perfection. Instead, optimizing and minimizing refer to selecting the velocity profile with the smallest total energy losses, as calculated by controller 44, within the constraints.

After the velocity profile is selected, controller 44 controls motion of elevator car 12 according to the selected velocity profile (step 130). Regenerative drive 34, brake 28, hoist motor 24, and all of elevator system 10 are operated so as to move elevator car 12 from a beginning of the run to a destination of the run with jerk, acceleration, and velocity selected to reduce energy losses.

If, on the other hand, normal mode is selected at step 112, then controller 44 selects a normal velocity profile (step 132). The normal velocity profile can be selected to reduce run time and provide desired ride quality according to virtually any method known in the art. Then controller 44 controls motion of elevator car 12 according to the normal mode velocity profile (step 134). Once elevator car 12 is at its destination, the method can be repeated in part or in entirety.

This method of reducing energy losses allows elevator system 10 to operate substantially more efficiently. Since elevator system 10 is a regenerative system, these loss reductions can amount to a significant portion of the total energy used by elevator system 10. This can be particularly useful in a variety of circumstances such as times of low traffic, times of high energy cost from main power supply MP, and times of poor energy or no energy being supplied by main power supply MP. In the loss reduction mode, the velocity profile can be optimized within a set of constraints to ensure safety and comfort and to limit delay. When greater speed is desired, elevator system 10 can operate in normal mode. Thus, elevator system 10 has the flexibility to adjust to various situations.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, the method described with respect to FIG. 5 can be used with a modified version of elevator system 10 or virtually any elevator system that benefits from operating in a loss reduction mode as herein described. Additionally, optimized velocity profiles for different systems performing different runs will look different than those illustrated in FIGS. 2B, 3B, and 4B.

The invention claimed is:

1. An elevator system comprising:
   a car;
   a hoist motor for elevating and lowering the car;
   a brake for limiting car movement;
   an input device for selecting a destination for a run; and
   a controller for receiving a command from the input device and for controlling operation of the hoist motor and the brake, wherein the controller has a loss reduction mode wherein the controller selects a velocity profile for the run that varies according to car load, run direction, and run distance to reduce a combined set of energy losses for the run;
   wherein the combined set of energy losses is substantially minimized within a set of constraints in the loss reduction mode;
   wherein the set of constraints includes limits on velocity, acceleration, jerk, and time for the run.

2. The elevator system of claim 1, wherein the combined set of energy losses includes motor losses, brake losses, and drive losses.

3. The elevator system of claim 1, and further comprising:
   a regenerative elevator drive for driving the hoist motor when operating in a drive mode and for delivering regenerated electrical power to a power supply when operating in a regeneration mode.

4. The elevator system of claim 1, wherein the controller further has a normal mode in which a normal velocity profile for the run has a combined set of energy losses greater than that of the velocity profile selected in the loss reduction mode.

5. The elevator system of claim 4, wherein a portion of the velocity profile selected in the loss reduction mode has a greater jerk value at a beginning or end of the run than a corresponding portion of the normal velocity profile selected in the normal mode for the run.

6. The elevator system of claim 4, wherein a portion of the velocity profile selected in the loss reduction mode has a greater magnitude of deceleration than a corresponding portion of the normal velocity profile selected in the normal mode for the run.

7. An elevator system comprising:
   a car;
   a hoist motor for elevating and lowering the car;
   a brake for limiting car movement;
   an input device for selecting a destination for a run; and
   a controller for receiving a command from the input device and for controlling operation of the hoist motor and the brake, wherein the controller has a normal mode that selects a first velocity profile for the run and a loss reduction mode that selects a second velocity profile for the run, wherein the second velocity profile uses less energy for the run than that of the first velocity profile, and wherein the second velocity profile has greater maximum jerk magnitude than the first velocity profile;
   wherein jerk at the beginning and jerk at the end of the first velocity profile have magnitudes greater than jerk at the beginning and jerk at the end of the second velocity profile, respectively.

8. The elevator system of claim 7, wherein the second velocity profile varies according to car load, run direction, and run distance to reduce a combined set of energy losses including motor losses, brake losses, and drive losses for the run.

9. The elevator system of claim 7, wherein the combined set of energy losses is substantially minimized within a predetermined set of constraints in the loss reduction mode.

10. The elevator system of claim 7, and further comprising:
a regenerative elevator drive for driving the hoist motor when operating in a drive mode and for delivering regenerated electrical power to a power supply when operating in a regeneration mode.

11. A method for operating an elevator, the method comprising:
receiving a command for a run in an elevator car;
selecting a velocity profile as a function of run direction, run distance, and car load to reduce a combined set of energy losses for that run; and
controlling motion of the elevator car according to the selected velocity profile;
wherein selecting a velocity profile includes determining the combined set of energy losses for a plurality of potential velocity profiles based upon the run direction, run distance, and car load prior to selecting the velocity profile;
wherein determining the combined set of energy losses includes:
determining copper and iron energy losses for a permanent magnet motor to move the elevator car over the course of the run;
determining energy losses to operate a brake over the course of the run;
determining switching energy losses to operate an elevator drive over the course of the run; and
calculating the combined set of energy losses to include losses for the permanent motor, the brake, and the elevator drive.

12. The method of claim 11, wherein the combined set of energy losses includes motor losses, brake losses, and drive losses.

13. The method of claim 11, wherein the combined set of energy losses for the velocity profile selected is smaller than that for a normal velocity profile.

14. The method of claim 11, wherein combined energy loss is minimized within a predetermined set of constraints that include limits on velocity, acceleration, jerk, and time.

15. The method of claim 11, and further comprising:
determining whether to move the elevator car in a normal mode or a loss reduction mode prior to selecting the velocity profile.

* * * * *